(12) United States Patent
Nakajima et al.

(10) Patent No.: US 9,179,525 B2
(45) Date of Patent: Nov. 3, 2015

(54) TERMINAL APPARATUS, BACKLIGHT CONTROL METHOD, AND BACKLIGHT CONTROL PROGRAM

(71) Applicant: FUJITSU LIMITED, Kawasaki-shi, Kanagawa (JP)

(72) Inventors: Tomohiro Nakajima, Kawasaki (JP); Naoyuki Sawasaki, Kawasaki (JP); Katsumi Otsuka, Kawasaki (JP); Yoku Takahashi, Minato (JP)

(73) Assignee: FUJITSU LIMITED, Kawasaki (JP)

( * ) Notice: Subject to any disclaimer, the term of this patent is extended or adjusted under 35 U.S.C. 154(b) by 298 days.

(21) Appl. No.: 13/863,288

(22) Filed: Apr. 15, 2013

(65) Prior Publication Data

US 2013/0285560 A1    Oct. 31, 2013

(30) Foreign Application Priority Data

Apr. 27, 2012 (JP) .................................. 2012-104040

(51) Int. Cl.
*H05B 37/02* (2006.01)
*H04M 1/22* (2006.01)
*H04W 52/02* (2009.01)

(52) U.S. Cl.
CPC ............. *H05B 37/0227* (2013.01); *H04M 1/22* (2013.01); *H04W 52/027* (2013.01); *H04W 52/0254* (2013.01); *H04M 2250/12* (2013.01); *H04M 2250/52* (2013.01)

(58) Field of Classification Search
CPC ............... H04M 1/22; H04M 2250/12; H04M 2250/52; H04W 52/0254; H04W 52/027
See application file for complete search history.

(56) References Cited

U.S. PATENT DOCUMENTS 8,170,621 B1 * 5/2012 Lockwood ..................... 455/566
8,982,034 B2 * 3/2015 Yang .............................. 345/102

(Continued)

FOREIGN PATENT DOCUMENTS

CN    101529878 A    9/2009
CN    101739116      6/2010

(Continued)

OTHER PUBLICATIONS

Office Action of Chinese Patent Application No. 201310148460.4 dated Sep. 26, 2014 with whole translated Office Action.
Extended European Search Report of European Patent Application No. 13163761.3 dated Feb. 19, 2014.

*Primary Examiner* — Patrick O'Neill
(74) *Attorney, Agent, or Firm* — Maschoff Brennan

(57) ABSTRACT

A terminal apparatus includes a display device; a first sensor configured to detect a proximity state of being in proximity to an object different from the terminal apparatus; a second sensor configured to detect vibrations; and a processor, wherein the processor determines whether or not a first detection value acquired from the first sensor indicates that the terminal apparatus is in the proximity state, turns off a backlight of the display device in accordance with the first detection value, and acquires, when it is determined that the first detection value does not indicate that the terminal apparatus is in the proximity state, a second detection value from the second sensor, determines whether or not the second detection value, which has been acquired, indicates that the terminal apparatus is vibrating, and turns off the backlight of the display device in accordance with the second detection value.

5 Claims, 10 Drawing Sheets

(56) References Cited

U.S. PATENT DOCUMENTS

| | | |
|---|---|---|
| 2004/0225904 A1 | 11/2004 | Perez et al. |
| 2004/0233153 A1* | 11/2004 | Robinson .................. 345/102 |
| 2007/0075965 A1 | 4/2007 | Huppi et al. |
| 2010/0079508 A1 | 4/2010 | Hodge et al. |
| 2011/0273378 A1 | 11/2011 | Alameh et al. |

FOREIGN PATENT DOCUMENTS

| | | |
|---|---|---|
| EP | 2096624 A1 | 9/2009 |
| JP | 2011-142497 A | 7/2011 |

* cited by examiner

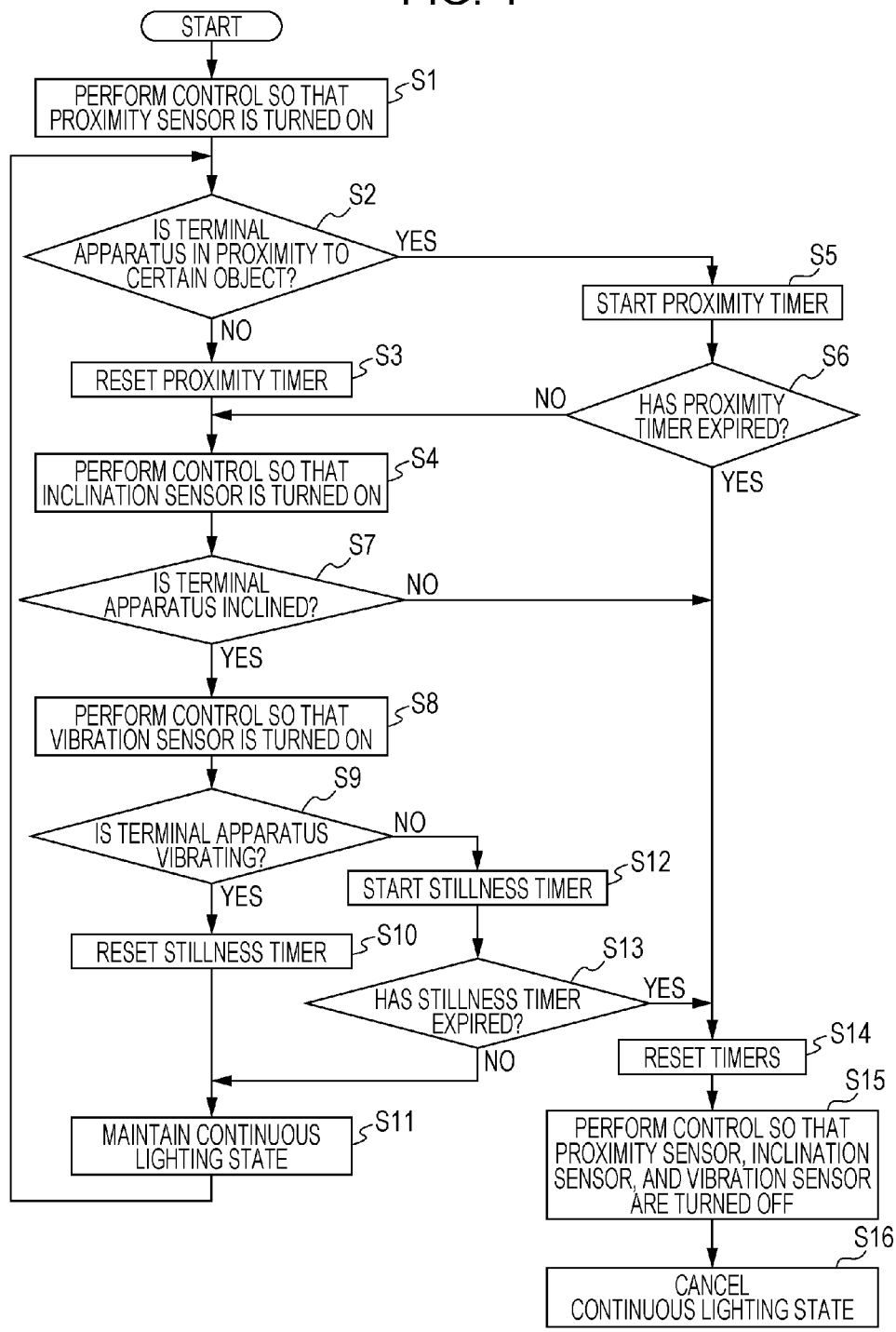

FIG. 5

| INCLINATION SENSOR | PROXIMITY SENSOR | VIBRATION SENSOR | DETERMINATION WHETHER USER IS HOLDING TERMINAL APPARATUS IN HAND | TIME PERIOD TAKEN TO DETERMINE THAT USER IS NOT HOLDING TERMINAL APPARATUS IN HAND |
|---|---|---|---|---|
| NOT INCLINED | DON'T CARE | DON'T CARE | NOT HOLDING IN HAND | 0 SECONDS (IMMEDIATELY AFTER INCLINATION SENSOR IS DRIVEN) |
| INCLINED | IN PROXIMITY TO CERTAIN OBJECT | DON'T CARE | NOT HOLDING IN HAND | 10 SECONDS |
| INCLINED | NOT IN PROXIMITY TO ANY OBJECT | NOT VIBRATING | NOT HOLDING IN HAND | 60 SECONDS |
| INCLINED | NOT IN PROXIMITY TO ANY OBJECT | VIBRATING | HOLDING IN HAND | — |

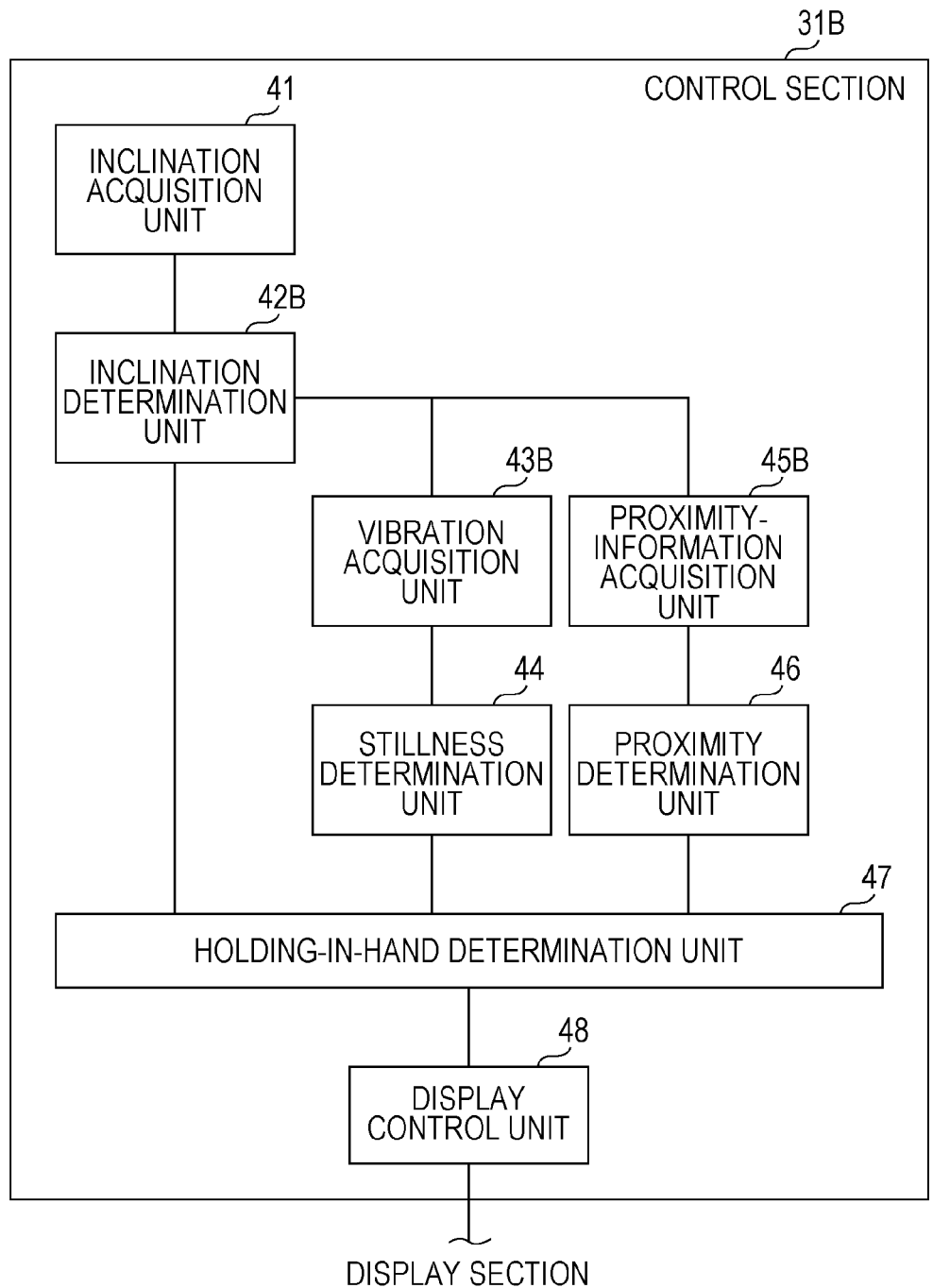

FIG. 11

| PROXIMITY SENSOR | INCLINATION SENSOR | VIBRATION SENSOR | DETERMINATION WHETHER USER IS HOLDING TERMINAL APPARATUS IN HAND | TIME PERIOD TAKEN TO DETERMINE THAT USER IS NOT HOLDING TERMINAL APPARATUS IN HAND |
|---|---|---|---|---|
| IN PROXIMITY TO CERTAIN OBJECT | DON'T CARE | DON'T CARE | NOT HOLDING IN HAND | 10 SECONDS |
| NOT IN PROXIMITY TO ANY OBJECT | NOT INCLINED | DON'T CARE | NOT HOLDING IN HAND | 0 SECONDS |
| NOT IN PROXIMITY TO ANY OBJECT | INCLINED | NOT VIBRATING | NOT HOLDING IN HAND | 60 SECONDS |
| NOT IN PROXIMITY TO ANY OBJECT | INCLINED | VIBRATING | HOLDING IN HAND | — |

TERMINAL APPARATUS, BACKLIGHT CONTROL METHOD, AND BACKLIGHT CONTROL PROGRAM

CROSS-REFERENCE TO RELATED APPLICATION

This application is based upon and claims the benefit of priority from the prior Japanese Patent Application No. 2012-104040 filed on Apr. 27, 2012, the entire contents of which are incorporated herein by reference.

FIELD

The embodiments discussed herein are related to a terminal apparatus, a backlight control method, and a backlight control program that are capable of controlling a backlight of a display.

BACKGROUND

In recent years, regarding terminal apparatuses such as mobile phones, smartphones, personal digital assistants (PDAs), and mobile personal computers (PCs), the size of the displays thereof has been increased. As the size of the display of such a terminal apparatus is increased as mentioned above, the visibility and operability are improved. Meanwhile, the current consumption increases. Accordingly, a problem that the time period for which the terminal apparatus is used decreases occurs.

In order to avoid the above-mentioned problem, in terminal apparatuses of the related art, a function of setting a lighting time period of a backlight in advance is implemented. However, when this function is used, in such a terminal apparatus, for example, when the lighting time period is set to be short, the backlight is automatically turned off although a user is looking at a display. In contrast, when the lighting time period is set to be long, in the terminal apparatus, the backlight is continuously turned on although the user is not looking at the display. Accordingly, the power is wastefully consumed.

For such an issue, among the terminal apparatuses of the related art, there is a terminal apparatus in which a function of turning on and off the backlight in accordance with an inclination obtained using an acceleration sensor is implemented. By using this function, performing control so that the backlight of the display is not turned off when the user is holding the terminal apparatus in his or her hand and looking at the display is made possible.

Japanese Laid-open Patent Publication No. 2011-142497 is an example of the related art.

However, in the terminal apparatus of the related art, when the function of performing control so that the backlight is turned on and off in accordance with the inclination of the terminal apparatus is used, this causes the acceleration sensor to continuously operate. Accordingly, a current of about 200 μA is continuously consumed. Thus, in the terminal apparatus of the related art, the continuous operation of the acceleration sensor is not desired.

SUMMARY

According to an aspect of the invention, a terminal apparatus includes a display device; a first sensor configured to detect a proximity state of being in proximity to an object different from the terminal apparatus; a second sensor configured to detect vibrations; and a processor, wherein the processor determines whether or not a first detection value acquired from the first sensor indicates that the terminal apparatus is in the proximity state, turns off a backlight of the display device in accordance with the first detection value, and acquires, when it is determined that the first detection value does not indicate that the terminal apparatus is in the proximity state, a second detection value from the second sensor, determines whether or not the second detection value, which has been acquired, indicates that the terminal apparatus is vibrating, and turns off the backlight of the display device in accordance with the second detection value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a flowchart illustrating a process performed by a control section in a first embodiment;

FIG. 5 is a table listing examples of conditions under which determination of whether a user is holding the terminal apparatus in his or her hand is performed;

FIG. 6 is a diagram illustrating an example of a functional block configuration of a terminal apparatus;

FIG. 11 is a table listing examples of conditions under which determination of whether the user is holding the terminal apparatus in his or her hand is performed.

DESCRIPTION OF EMBODIMENTS

Hereinafter, embodiments of a terminal apparatus, a backlight control method, and a backlight control program that are disclosed in this application will be described in detail with reference to the drawings. Note that the present disclosure is not limited by the embodiments.

First Embodiment

Figure 1:
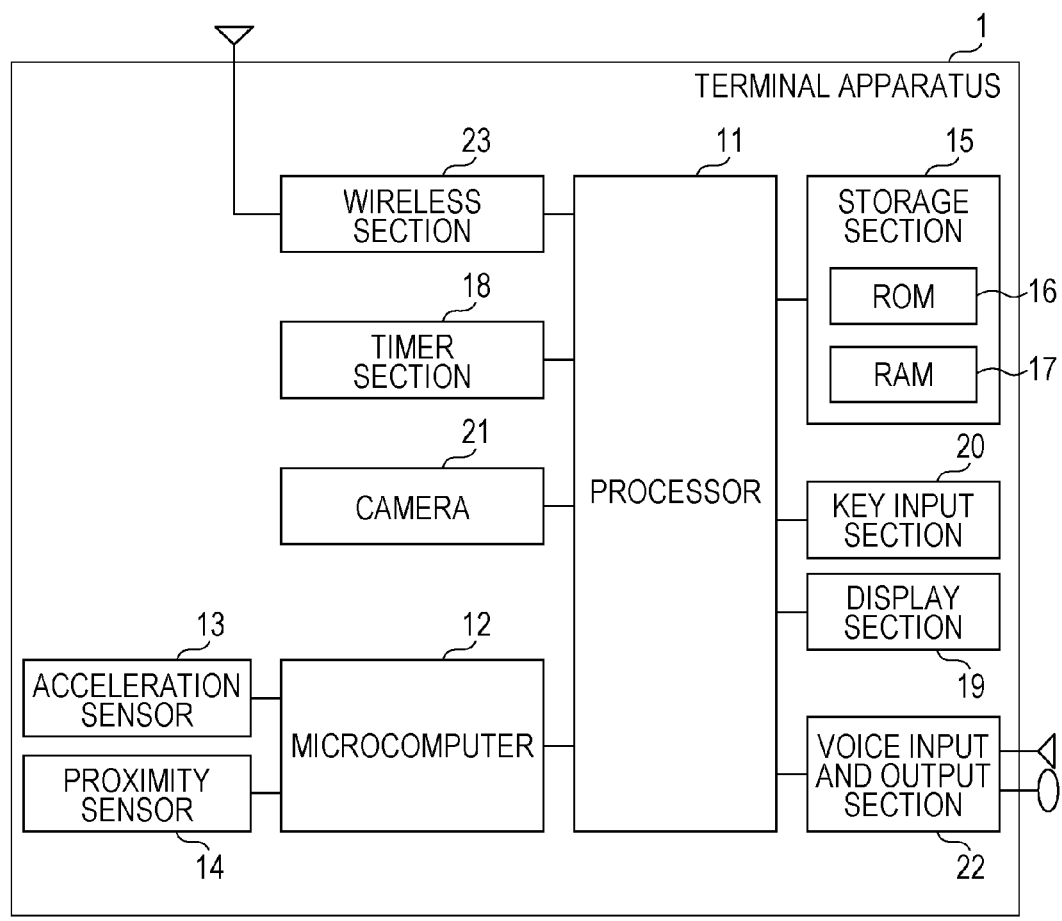
FIG. 1 is a diagram illustrating an example of a hardware configuration of a terminal apparatus.

FIG. 1 is a diagram illustrating an example of a hardware configuration of a terminal apparatus according to a present embodiment. Referring to FIG. 1, a terminal apparatus 1 includes a processor 11 that is a central processing unit (CPU) or a field programmable gate array (FPGA). Furthermore, the terminal apparatus 1 further includes a microcomputer 12 that controls various types of sensors, such as an acceleration sensor 13 and a proximity sensor 14, and a storage section 15 that includes various types of memories, such as a read only memory (ROM) 16 and a random access memory (RAM) 17. Moreover, the terminal apparatus 1 further includes a timer section 18, a display section 19, a key input section 20, a camera 21, a voice input and output section 22 that controls a speaker and a microphone, and a wireless section 23 that performs transmission and reception of a signal via an antenna.

The processor 11 is connected to various types of hardware included in the terminal apparatus 1. Accordingly, the processor 11 controls overall control of the apparatus, and executes, for example, a backlight control program according to the present embodiment. Regarding the storage section 15, in the ROM 16, various types of programs, such as the backlight control program according to the present embodiment, are stored. Furthermore, in the RAM 17, for example, data that is obtained in the course of a process is stored. The processor 11 reads the backlight control program according to the present embodiment from the ROM 16, and performs control of a backlight. Note that the timer section 18 includes multiple timers, and is controlled by the processor 11 so as to cause each of the timers to start and stop counting.

Furthermore, the microcomputer 12 detects, using the acceleration sensor 13, an inclination and vibrations of the terminal apparatus 1. Note that the acceleration sensor 13 may be a gyro sensor. Moreover, the terminal apparatus 1 may include both an acceleration sensor and a gyro sensor so as to function as a sensor that detects an inclination and vibrations. Additionally, when the acceleration sensor 13 is driven, a current of about 200 µA is consumed. Hereinafter, in the present embodiment, a case where, for example, the acceleration sensor 13 is used as a sensor that detects an inclination and vibrations will be described.

Furthermore, the microcomputer 12 detects, using the proximity sensor 14, whether an object is in proximity to the terminal apparatus 1. Examples of the proximity sensor 14 include an optical sensor, an infrared sensor, and an ultrasonic sensor. When the proximity sensor 14 is driven, a current of about 3 µA is consumed. Note that, although the microcomputer 12 and the processor 11 are individually disposed in the present embodiment, the disposition of the microcomputer 12 and the processor 11 is not limited thereto. The microcomputer 12 and the processor 11 may be formed as one piece.

Moreover, the display section 19 is a display, and is controlled by the processor 11 so as to perform a process of displaying a screen. The key input section 20 is an operation keypad or the like. The camera 21 is controlled by the processor 11 so as to be capable of capturing a moving image and a still image. The voice input and output section 22 is controlled by the processor 11 so as to perform a process of outputting a voice to the speaker and a process of inputting a voice from the microphone. The wireless section 23 is controlled by the processor 11 so as to transmit and receive voice-call data or the like via the antenna.

Note that the terminal apparatus 1 according to the present embodiment is capable of operating as a mobile information terminal such as a mobile phone, a smartphone, a PDA, or a mobile PC.

Figure 2:
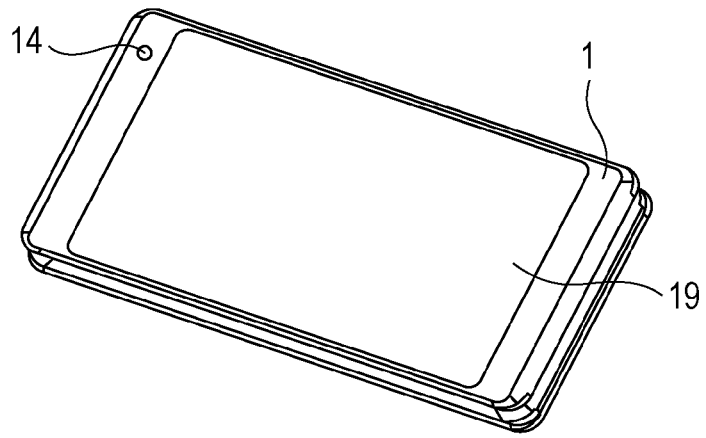
FIG. 2 is a perspective view of the terminal apparatus.

FIG. 2 is a perspective view of the terminal apparatus 1. The terminal apparatus 1 according to the present embodiment is configured so that the proximity sensor 14 is able to emit light, such as infrared light, so as to cause the light to travel from a hole, which is provided in a housing, to the outside of the housing, and is able to receive reflected light of the light.

Figure 3:
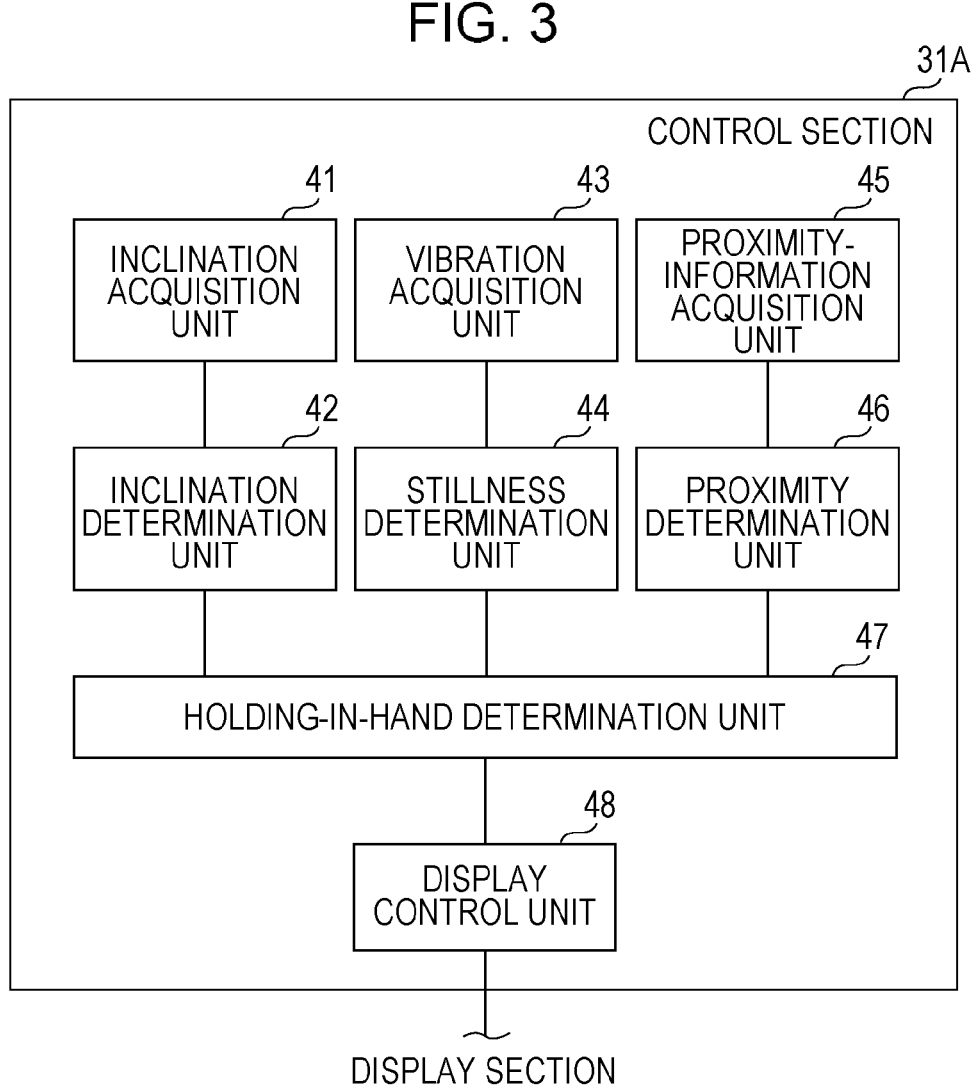
FIG. 3 is a diagram illustrating an example of a functional block configuration of the terminal apparatus.

Furthermore, FIG. 3 is a diagram illustrating an example of a functional block configuration of the terminal apparatus according to the present embodiment. The processor 11 executes the backlight control program according to the first embodiment, thereby operating as a control section 31A. Referring to FIG. 3, the control section 31A includes an inclination acquisition unit 41, an inclination determination unit 42, a vibration acquisition unit 43, a stillness determination unit 44, a proximity-information acquisition unit 45, a proximity determination unit 46, a holding-in-hand determination unit 47, and a display control unit 48.

The inclination acquisition unit 41 acquires a value indicating an inclination of the terminal apparatus 1, which has been detected by the microcomputer 12 using the acceleration sensor 13. The inclination determination unit 42 smoothes the value indicating an inclination, which has been obtained from the inclination acquisition unit 41, and determines whether the terminal apparatus 1 is inclined. For example, a reference value that is used to determine whether the terminal apparatus 1 is inclined is provided, and the inclination determination unit 42 determines, using this reference value, whether the terminal apparatus 1 is inclined. Note that the reference value may be appropriately changed by a user.

The vibration acquisition unit 43 acquires a value indicating vibrations of the terminal apparatus 1, which have been detected by the microcomputer 12 using the acceleration sensor 13. The stillness determination unit 44 smoothes the value indicating vibrations, which has been obtained from the vibration acquisition unit 43, and determines whether the terminal apparatus 1 is still. For example, a reference value that is used to determine whether the terminal apparatus 1 is still without vibrating is provided, and the stillness determination unit 44 determines, using this reference value, whether the terminal apparatus 1 is still. Note that the reference value may be appropriately changed by the user.

The proximity-information acquisition unit 45 acquires proximity information that has been detected by the microcomputer 12 using the proximity sensor 14, that is, information indicating whether the terminal apparatus 1 is in proximity to a certain object. The proximity determination unit 46 determines, based on the proximity information obtained from the proximity-information acquisition unit 45, whether the terminal apparatus 1 is in proximity to a certain object.

The holding-in-hand determination unit 47 determines, based on at least any one of results of determination performed by the inclination determination unit 42, the stillness determination unit 44, and the proximity determination unit 46, whether the user is holding the terminal apparatus 1 in his or her hand. Then, the holding-in-hand determination unit 47 instructs the display control unit 48 to set and cancel a continuous lighting state. The display control unit 48 performs control so that the backlight of the display section 19 is turned on and turned off. Furthermore, the display control unit 48 displays an icon on the screen or turns on a light emitting diode (LED), thereby notifying the user that the backlight is in the continuous lighting state.

Next, control of the backlight performed by the control section 31A, that is, a process performed in accordance with the backlight control program according to the first embodiment, will be described in detail with reference to the drawings. FIG. 4 is a flowchart illustrating a process performed by the control section 31A. Note that it is assumed that the control section 31A operates so that the backlight enters, using turning on of the backlight as a trigger, the continuous lighting state. In this state, the control section 31A starts performing control of the backlight in the present embodiment. Furthermore, in the terminal apparatus 1, separately from control of the backlight in the present embodiment, it is supposed that a lighting time period is set in advance by the above-described "function of setting the lighting time period of the backlight in advance".

The holding-in-hand determination unit 47 of the control section 31A transmits, using turning on of the backlight as a trigger, to the microcomputer 12, an instruction to turn on the proximity sensor 14 (step S1).

The proximity-information acquisition unit 45 transfers, to the proximity determination unit 46, the proximity information transmitted from the microcomputer 12. The proximity determination unit 46 determines, based on the proximity information transferred from the proximity-information acquisition unit 45, whether the terminal apparatus 1 is in proximity to a certain object (step S2).

For example, when the proximity determination unit 46 determines that the terminal apparatus 1 is not in proximity to any object (NO in step S2), the proximity determination unit 46 notifies the holding-in-hand determination unit 47 of information indicating that the terminal apparatus 1 is not in proximity to any object. Moreover, in the case where a proximity timer included in the timer section 18 is counting, the proximity determination unit 46 resets the proximity timer, thereby causing the proximity timer to stop counting (step S3). After that, the holding-in-hand determination unit 47, which has been notified of the information indicating that the terminal apparatus 1 is not in proximity to any object, transmits, to the microcomputer 12, an instruction to turn on the acceleration sensor 13 that serves as an inclination sensor (step S4). Note that, when the acceleration sensor 13 has already been turned on, the process of step S4 is skipped.

Moreover, in the determination process of step S2, when the proximity determination unit 46 determines that the terminal apparatus 1 is in proximity to a certain object (YES in S2), the proximity determination unit 46 starts the proximity timer included in the timer section 18 (step S5). Note that, when the proximity timer has already started counting, the process of step S5 is skipped. Then, the holding-in-hand determination unit 47 determines whether the proximity timer has expired (step S6). When the holding-in-hand determination unit 47 determines that the proximity timer has not expired (NO in step S6), the holding-in-hand determination unit 47 transmits, to the microcomputer 12, an instruction to turn on the acceleration sensor 13 that serves as an inclination sensor (step S4). Note that, when the acceleration sensor 13 has already been turned on, the process of step S4 is skipped.

After that, the inclination acquisition unit 41 transfers, to the inclination determination unit 42, a value that indicates an inclination and that is periodically transmitted from the microcomputer 12. The inclination determination unit 42 smoothes the value indicating an inclination, which has been transferred from the inclination acquisition unit 41, and determines, using the smoothed value, whether the terminal apparatus 1 is inclined (step S7). For example, when the inclination determination unit 42 determines that the terminal apparatus 1 is inclined (YES in step S7), the inclination determination unit 42 notifies the holding-in-hand determination unit 47 of information indicating that the terminal apparatus 1 is inclined. After that, the holding-in-hand determination unit 47, which has been notified of the information indicating that the terminal apparatus 1 is inclined, transmits, to the microcomputer 12, an instruction to turn on the acceleration sensor 13 that serves as a vibration sensor (step S8). Here, because the acceleration sensor 13 has already been turned on, the process of step S8 is skipped.

Next, the vibration acquisition unit 43 transfers, to the stillness determination unit 44, a value that indicates vibrations and that is periodically transmitted from the microcomputer 12. The stillness determination unit 44 smoothes the value indicating vibrations, which has been transferred from the vibration acquisition unit 43, and determines, using the smoothed value, whether the terminal apparatus 1 is vibrating, that is, whether the terminal apparatus 1 is shaking (step S9).

For example, when the stillness determination unit 44 determines that the terminal apparatus 1 is vibrating (YES in step S9), the stillness determination unit 44 notifies the holding-in-hand determination unit 47 of information indicating that the terminal apparatus 1 is vibrating. Furthermore, when a stillness timer included in the timer section 18 is counting, the stillness determination unit 44 resets the stillness timer, thereby causing the stillness timer to stop counting (step S10). Then, the holding-in-hand determination unit 47, which has been notified of the information indicating that the terminal apparatus 1 is vibrating, instructs the display control unit 48 to maintain the continuous lighting state (step S11).

Moreover, in the determination process of step S9, when the stillness determination unit 44 determines that the terminal apparatus 1 is not vibrating (NO in step S9), the stillness determination unit 44 starts the stillness timer included in the timer section 18 (step S12). Note that, when the stillness timer has already started counting, the process of step S12 is skipped. Then, the holding-in-hand determination unit 47 determines whether the stillness timer has expired (step S13). When the holding-in-hand determination unit 47 determines that the stillness timer has not expired (NO in step S13), the holding-in-hand determination unit 47 instructs the display control unit 48 to maintain the continuous lighting state (step S11).

In other words, when the terminal apparatus 1 is not in proximity to any object, is inclined, and vibrating (NO in step S2, YES in step S7, and YES in step S9), the holding-in-hand determination unit 47 determines that the user is holding the terminal apparatus 1 in his or her hand, and instructs the display control unit 48 to maintain the continuous lighting state (step S11). FIG. 5 is a table listing conditions under which determination of whether the user is holding the terminal apparatus 1 in his or her hand is performed, and time periods taken to determine that the user is not holding the terminal apparatus 1 in his or her hand. For example, the above-mentioned case in which the holding-in-hand determination unit 47 determines that the user is holding the terminal apparatus 1 in his or her hand corresponds to the first case from the bottom in FIG. 5.

Furthermore, when the terminal apparatus 1 is inclined and the proximity timer is operating (NO in step S6), the holding-in-hand determination unit 47 determines that the proximity determination unit 46 is determining whether the terminal apparatus 1 has been in proximity to a certain object for a fixed time period, and instructs the display control unit 48 to maintain the continuous lighting state (step S11). Note that the fixed time period is a time period indicating the expiry of the proximity timer. Here, it is assumed that the fixed time period is, for example, 10 seconds.

Additionally, when the terminal apparatus 1 is inclined and the stillness timer is operating (NO in step S13), the holding-in-hand determination unit 47 determines that the stillness determination unit 44 is determining whether the terminal apparatus 1 has remained still for a fixed time period, and instructs the display control unit 48 to maintain the continuous lighting state (step S11). Note that the fixed time period is a time period indicating the expiry of the stillness timer. Here, it is assumed that the fixed time period is, for example, 60 seconds.

In contrast, in the determination process of step S7, when the inclination determination unit 42 determines that the terminal apparatus 1 is not inclined (NO in step S7), the inclination determination unit 42 notifies the holding-in-hand determination unit 47 of information indicating that the terminal apparatus 1 is not inclined. The holding-in-hand determination unit 47, which has been notified of the information indicating that the terminal apparatus 1 is not inclined, determines that the user is not holding the terminal apparatus 1 in his or her hand. This case corresponds to the first case from the top in FIG. 5. In other words, the holding-in-hand determination unit 47 may determine that the user is not holding the terminal apparatus 1 in his or her hand immediately after the inclination sensor has been turned on.

Furthermore, it is determined that the terminal apparatus 1 is inclined and the proximity timer has expired (YES in step S6), the holding-in-hand determination unit 47 determines that the user is not holding the terminal apparatus 1 in his or her hand. This case corresponds to the second case from the top in FIG. 5. In other words, at a point in time when 10 seconds, which is the time period indicating the expiry of the proximity timer, have elapsed since the proximity timer started, the holding-in-hand determination unit 47 may determine that the user is not holding the terminal apparatus 1 in his or her hand.

Furthermore, when it is determined that the terminal apparatus 1 is inclined and the stillness timer has expired (YES in step S13), the holding-in-hand determination unit 47 determines that the user is not holding the terminal apparatus 1 in his or her hand. This case corresponds to the third case from the top in FIG. 5. In other words, at a point in time when 60 seconds, which is the time period indicating the expiry of the stillness timer, have elapsed since the stillness timer started, the holding-in-hand determination unit 47 may determine that the user is not holding the terminal apparatus 1 in his or her hand.

Then, the holding-in-hand determination unit 47, which has determined that the user is not holding the terminal apparatus 1 in his or her hand, resets all timers that are counting among the timers included in the timer section 18, thereby causing the timers to stop counting (step S14). Moreover, the holding-in-hand determination unit 47 transmits, to the microcomputer 12, an instruction to turn off all sensors that are operating (step S15). Finally, the holding-in-hand determination unit 47 instructs the display control unit 48 to cancel the continuous lighting state (step S16).

After that, for example, after the lighting time period, which has been set by the "function of setting the lighting time period of the backlight in advance", has elapsed since the display control unit 48 was instructed to cancel the continuous lighting state, the display control unit 48 turns off the backlight of the display section 19.

As described above, in the terminal apparatus 1 according to the present embodiment, the holding-in-hand determination unit 47 determines, based on at least any one of results of determination performed by the inclination determination unit 42, the stillness determination unit 44, and the proximity determination unit 46, whether the user is holding the terminal apparatus 1 in his or her hand. Then, the holding-in-hand determination unit 47 determines, based on a result of determination of whether the user is holding the terminal apparatus 1 in his or her hand, whether the continuous lighting state is to be maintained or cancelled. Accordingly, even though accidental turning off of the backlight is avoided, the backlight may be appropriately turned off when the backlight is unnecessary. Thus, the power consumption may be efficiently reduced.

Note that the time periods of 0 seconds, 10 seconds, and 60 seconds, which are time periods taken to determine that the user is not holding the terminal apparatus 1 in his or her hand and which are illustrated in FIG. 5, are examples, and any time periods may be set as the time periods by the user of the terminal apparatus 1.

Furthermore, in the terminal apparatus 1 according to the present embodiment, in accordance with an instruction provided from the holding-in-hand determination unit 47, the display control unit 48 displays an icon on the screen or turns on an LED, whereby the user may be notified that the backlight is in the continuous lighting state. For example, the holding-in-hand determination unit 47 provides, using turning on of the backlight as a trigger, an instruction to display an icon indicating that the backlight is in the continuous lighting state on the screen, and provides an instruction to delete the icon several seconds before any one of the timers expires. Accordingly, the user of the terminal apparatus 1 may recognize that the continuous lighting state is to be cancelled in several seconds. For example, the continuous lighting state may be maintained by inclining, shaking, or moving the terminal apparatus 1.

Moreover, in the present embodiment, the inclination determination unit 42 determines whether the terminal apparatus 1 is inclined (step S7). However, control of the backlight may be performed without performing this process. In the case where determination of whether the terminal apparatus 1 is inclined is not performed, control of the backlight is performed based on results of determination performed by the stillness determination unit 44 and the proximity determination unit 46. In this case, FIG. 4 becomes a diagram in which steps S4 and S7 are removed, in which steps S3 and S8 are directly connected, and in which steps S6 (NO) and S8 are directly connected.

Additionally, in the present embodiment, the proximity sensor 14 is turned on using as turning on of the backlight as a trigger (step S1). However, this trigger is not limited thereto. For example, in the case where the lighting time period is set in advance by the above-described "function of setting the lighting time period of the backlight in advance", the holding-in-hand determination unit 47 may start, using turning on of the backlight as a trigger, monitoring the lighting time period. Further, the holding-in-hand determination unit 47 may transmit, using a lapse of the lighting time period as a trigger, to the microcomputer 12, an instruction to turn on the proximity sensor 14 (step S1). In this case, in the process of step S16, the holding-in-hand determination unit 47 instructs the display control unit 48 to turn off the backlight (step S16).

Second Embodiment

In the first embodiment, a case is described, in which the acceleration sensor 13 is driven after the proximity sensor 14 has been driven. However, in a second embodiment, control of the backlight in the case where detection of an inclination by the acceleration sensor 13 is performed before the proximity sensor 14 is driven will be described. Note that, because a hardware configuration of a terminal apparatus 1 according to the second embodiment is the same as that illustrated in FIG. 1 in the foregoing first embodiment, a description thereof is omitted.

FIG. 6 is a diagram illustrating an example of a functional block configuration of the terminal apparatus according to the present embodiment. The processor 11 illustrated in FIG. 1 executes a backlight control program according to the second embodiment, thereby operating as a control section 31B. Referring to FIG. 6, the control section 31B includes an inclination acquisition unit 41, an inclination determination unit 42B, a vibration acquisition unit 43B, a stillness determination unit 44, a proximity-information acquisition unit 45B, a proximity determination unit 46, a holding-in-hand determination unit 47, and a display control unit 48. Note that elements of the control section 31B that are the same as the elements of the control section 31A described above are denoted by the same reference numerals, and a description of the same elements is omitted.

In addition to the function of the inclination determination unit 42 in the first embodiment, the inclination determination unit 42B has a function of notifying, in the case where the inclination determination unit 42 determines that the terminal apparatus 1 is inclined, the vibration acquisition unit 43B and the proximity-information acquisition unit 45B that the terminal apparatus 1 is inclined. When the vibration acquisition unit 43B has received the notification from the inclination determination unit 42B, the vibration acquisition unit 43B is enabled to acquire a value indicating vibrations of the terminal apparatus 1, which have been detected by the microcomputer 12 using the acceleration sensor 13. Furthermore, when the proximity-information acquisition unit 45B has received the notification from the inclination determination unit 42B, the proximity-information acquisition unit 45B is enabled to acquire the proximity information that has been detected by the microcomputer 12 using the proximity sensor 14.

Figure 7:
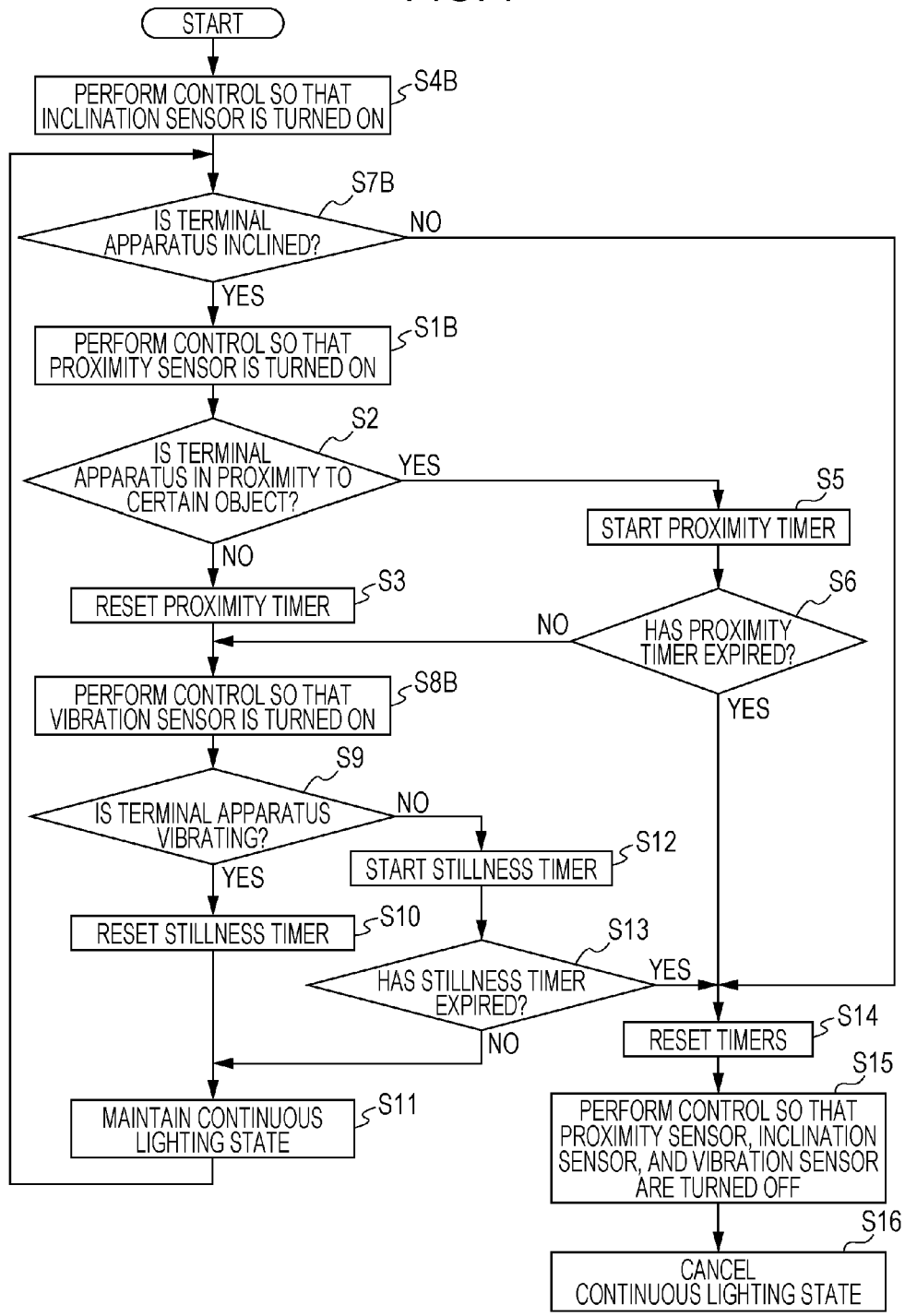
FIG. 7 is a flowchart illustrating a process performed by a control section in a second embodiment.

Next, control of the backlight performed by the control section 31B, that is, a process performed in accordance with the backlight control program according to the second embodiment, will be described in detail with reference to the drawings. FIG. 7 is a flowchart illustrating a process performed by the control section 31B. Note that it is assumed that the control section 31B operates so that the backlight enters, using turning on of the backlight as a trigger, the continuous lighting state. In this state, the control section 31B starts performing control of the backlight in the present embodiment. Furthermore, in the terminal apparatus 1, separately from control of the backlight in the present embodiment, it is supposed that a lighting time period is set in advance by the above-described "function of setting the lighting time period of the backlight in advance".

The holding-in-hand determination unit 47 of the control section 31B transmits, using turning on of the backlight as a trigger, to the microcomputer 12, an instruction to turn on the acceleration sensor 13 (step S4B).

The inclination acquisition unit 41 transfers, to the inclination determination unit 42B, a value that indicates an inclination and that is periodically transmitted from the microcomputer 12. The inclination determination unit 42B smoothes the value indicating an inclination, which has been transferred from the inclination acquisition unit 41, and determines, using the smoothed value, whether the terminal apparatus 1 is inclined (step S7B). For example, when the inclination determination unit 42B determines that the terminal apparatus 1 is inclined (YES in step S7B), the inclination determination unit 42 notifies the holding-in-hand determination unit 47, the vibration acquisition unit 43B, and the proximity-information acquisition unit 45B of information indicating that the terminal apparatus 1 is inclined. After that, the holding-in-hand determination unit 47, which has been notified of the information indicating that the terminal apparatus 1 is inclined, transmits, to the microcomputer 12, an instruction to turn on the proximity sensor 14 (step S1B). Note that, in the case where the proximity sensor 14 has already been turned on, the process of step S1B is skipped. Moreover, the vibration acquisition unit 43B receives, from the inclination determination unit 42B, the information indicating that the terminal apparatus 1 is inclined, whereby the vibration acquisition unit 43B is enabled to acquire the value indicating an inclination. Additionally, the proximity-information acquisition unit 45B receives, from the inclination determination unit 42B, the information indicating that the terminal apparatus 1 is inclined, whereby the proximity-information acquisition unit 45B is enabled to acquire proximity information.

After that, the proximity-information acquisition unit 45B transfers, to the proximity determination unit 46, the proximity information transmitted from the microcomputer 12. The proximity determination unit 46 determines, based on the proximity information transferred from the proximity-information acquisition unit 45B, whether the terminal apparatus 1 is in proximity to a certain object (step S2).

For example, when the proximity determination unit 46 determines that the terminal apparatus 1 is not in proximity to any object (NO in step S2), the proximity determination unit 46 notifies the holding-in-hand determination unit 47 of information indicating that the terminal apparatus 1 is not in proximity to any object. Moreover, in the case where a proximity timer included in the timer section 18 is counting, the proximity determination unit 46 resets the proximity timer, thereby causing the proximity timer to stop counting (step S3). After that, the holding-in-hand determination unit 47, which has been notified of the information indicating that the terminal apparatus 1 is not in proximity to any object, transmits, to the microcomputer 12, an instruction to turn on the acceleration sensor 13 that serves as a vibration sensor (step S8B). Here, because the acceleration sensor 13 has already been turned on, the process of step S8B is skipped.

Moreover, in the determination process of step S2, when the proximity determination unit 46 determines that the terminal apparatus 1 is in proximity to a certain object (YES in S2), the proximity determination unit 46 starts the proximity timer included in the timer section 18 (step S5). Note that, when the proximity timer has already started counting, the process of step S5 is skipped. Then, the holding-in-hand determination unit 47 determines whether the proximity timer has expired (step S6). When the holding-in-hand determination unit 47 determines that the proximity timer has not expired (NO in step S6), the holding-in-hand determination unit 47 transmits, to the microcomputer 12, an instruction to turn on the acceleration sensor 13 that serves as a vibration sensor (step S8B). Here, because the acceleration sensor 13 has already been turned on, the process of step S8B is skipped.

Next, the vibration acquisition unit 43B transfers, to the stillness determination unit 44, a value that indicates vibrations and that is periodically transmitted from the microcomputer 12. The stillness determination unit 44 smoothes the value indicating vibrations, which has been transferred from the vibration acquisition unit 43B, and determines, using the smoothed value, whether the terminal apparatus 1 is vibrating, that is, whether the terminal apparatus 1 is shaking (step S9).

For example, when the stillness determination unit 44 determines that the terminal apparatus 1 is vibrating (YES in step S9), the stillness determination unit 44 notifies the holding-in-hand determination unit 47 of information indicating that the terminal apparatus 1 is vibrating. Furthermore, when a stillness timer included in the timer section 18 is counting, the stillness determination unit 44 resets the stillness timer, thereby causing the stillness timer to stop counting (step S10). Then, the holding-in-hand determination unit 47, which has been notified of the information indicating that the terminal apparatus 1 is vibrating, instructs the display control unit 48 to maintain the continuous lighting state (step S11).

Moreover, in the determination process of step S9, when the stillness determination unit 44 determines that the terminal apparatus 1 is not vibrating (NO in step S9), the stillness determination unit 44 starts the stillness timer included in the timer section 18 (step S12). Note that, when the stillness timer has already started counting, the process of step S12 is skipped. Then, the holding-in-hand determination unit 47 determines whether the stillness timer has expired (step S13). When the holding-in-hand determination unit 47 determines that the stillness timer has not expired (NO in step S13), the holding-in-hand determination unit 47 instructs the display control unit 48 to maintain the continuous lighting state (step S11).

In other words, when the terminal apparatus 1 is inclined, is not in proximity to any object, and vibrating (YES in step S7B, NO in step S2, and YES in step S9), the holding-in-hand determination unit 47 determines that the user is holding the terminal apparatus 1 in his or her hand, and instructs the display control unit 48 to maintain the continuous lighting state (step S11). For example, the above-mentioned case in which the holding-in-hand determination unit 47 determines that the user is holding the terminal apparatus 1 in his or her hand corresponds to the first case from the bottom in FIG. 5. Note that, when the terminal apparatus 1 is inclined and the proximity timer is operating (NO in step S6), the continuous lighting state is maintained as in the foregoing first embodiment. Furthermore, also when the terminal apparatus 1 is inclined and the stillness timer is operating (NO in step S13), the continuous lighting state is maintained as in the foregoing first embodiment.

Additionally, when it is determined that the terminal apparatus 1 is not inclined (NO in step S7B), the holding-in-hand determination unit 47 determines that the user is not holding the terminal apparatus 1 in his or her hand, as in the foregoing first embodiment. Additionally, also when it is determined that the proximity timer has expired (YES in step S6), the holding-in-hand determination unit 47 determines that the user is not holding the terminal apparatus 1 in his or her hand, as in the foregoing first embodiment. Moreover, also when it is determined that the stillness timer has expired (YES in step S13), the holding-in-hand determination unit 47 determines that the user is not holding the terminal apparatus 1 in his or her hand, as in the foregoing first embodiment. Thereafter, the holding-in-hand determination unit 47 sequentially performs the processes of steps S14, S15, and S16.

As described above, in the terminal apparatus 1 according to the present embodiment, the holding-in-hand determination unit 47 determines, based on at least any one of results of determination performed by the inclination determination unit 42B, the stillness determination unit 44, and the proximity determination unit 46, whether the user is holding the terminal apparatus 1 in his or her hand. Then, the holding-in-hand determination unit 47 determines, based on a result of determination of whether the user is holding the terminal apparatus 1 in his or her hand, whether the continuous lighting state is to be maintained or cancelled. Accordingly, even though accidental turning off of the backlight is avoided, the backlight may be appropriately turned off when the backlight is unnecessary. Thus, the power consumption may be efficiently reduced. Moreover, when the terminal apparatus 1 is not inclined, cancellation of the continuous lighting state is made possible without driving the proximity sensor 14. Thus, the power consumption may be more efficiently reduced.

Note that, in the present embodiment, control is performed, using turning on of the backlight as a trigger, so that the inclination sensor is turned on (step S4B). However, this trigger is not limited thereto. For example, in the case where the lighting time period is set in advance by the above-described function of setting the lighting time period of the backlight in advance, the holding-in-hand determination unit 47 may start, using turning on of the backlight as a trigger, monitoring the lighting time period. Further, the holding-in-hand determination unit 47 may perform, using a lapse of the lighting time period as a trigger, control so that the inclination sensor is turned on (step S4B). In this case, in the process of step S16, the holding-in-hand determination unit 47 instructs the display control unit 48 to turn off the backlight (step S16).

Third Embodiment

In a third embodiment, when it is determined that the user is not holding the terminal apparatus 1 in his or her hand, whether the user is using the terminal apparatus 1 while not holding the terminal apparatus 1 is further determined using a face image. Note that, because a hardware configuration of a terminal apparatus 1 according to the third embodiment is the same as that illustrated in FIG. 1 in the foregoing first embodiment, a description thereof is omitted.

Figure 8:
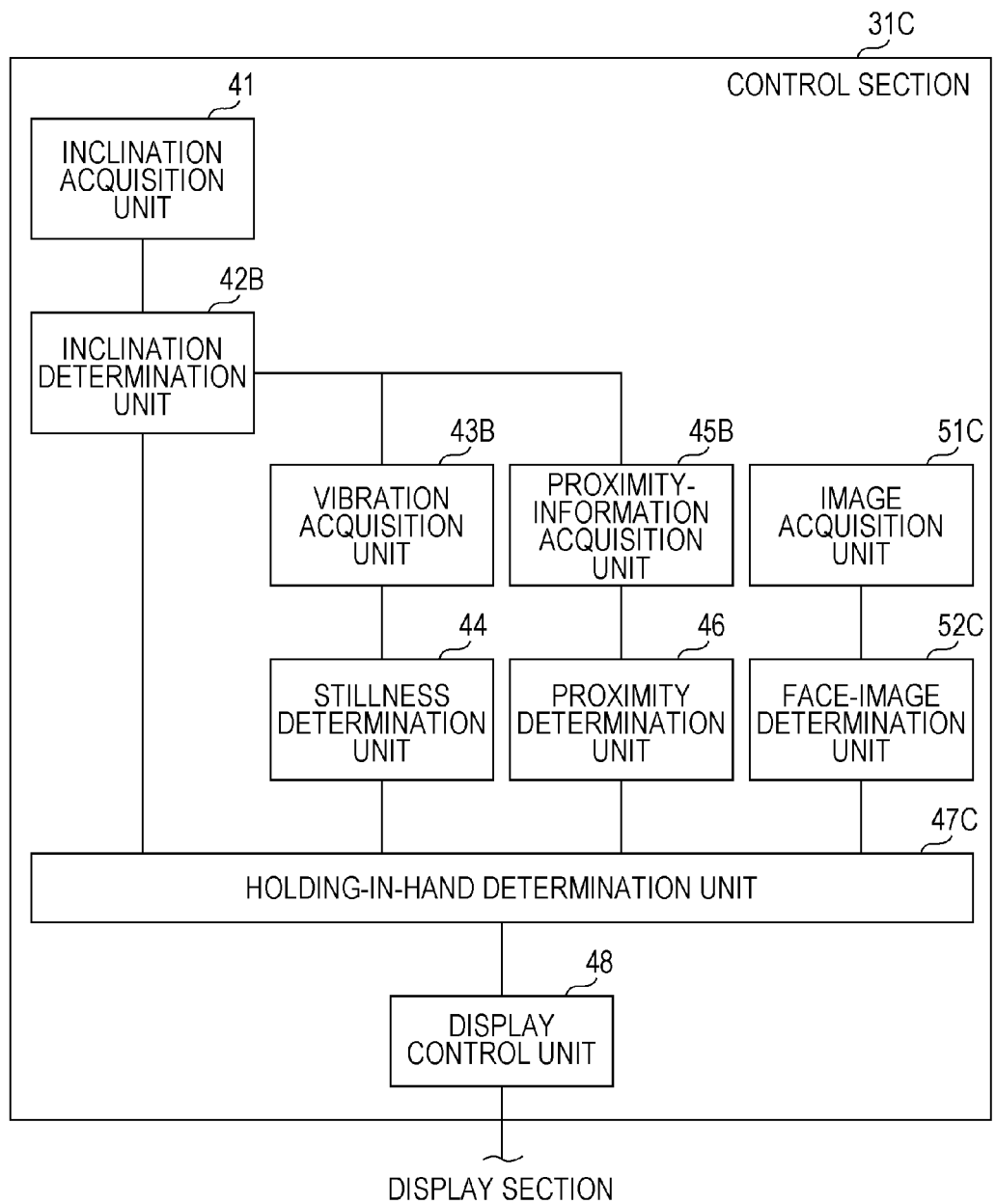
FIG. 8 is a diagram illustrating an example of a functional block configuration of a terminal apparatus.

FIG. 8 is a diagram illustrating an example of a functional block configuration of the terminal apparatus according to the present embodiment. The processor 11 illustrated in FIG. 1 executes a backlight control program according to the third embodiment, thereby operating as a control section 31C. Referring to FIG. 8, the control section 31C includes, in addition to the configuration of the control section 31B in the second embodiment, an image acquisition unit 51C and a face-image determination unit 52C. Note that elements of the control section 31C that are the same as the elements of the control section 31B described above are denoted by the same reference numerals, and a description of the same elements is omitted.

The image acquisition unit 51C acquires an image captured by an in-camera. The face-image determination unit 52C determines whether a face image is included in the image obtained from the image acquisition unit 51C. The holding-in-hand determination unit 47C determines, based on a result of determination performed by the face-image determination unit 52C, whether the user is using the terminal apparatus 1 while not holding the terminal apparatus 1 in his or her hand.

Figure 9:
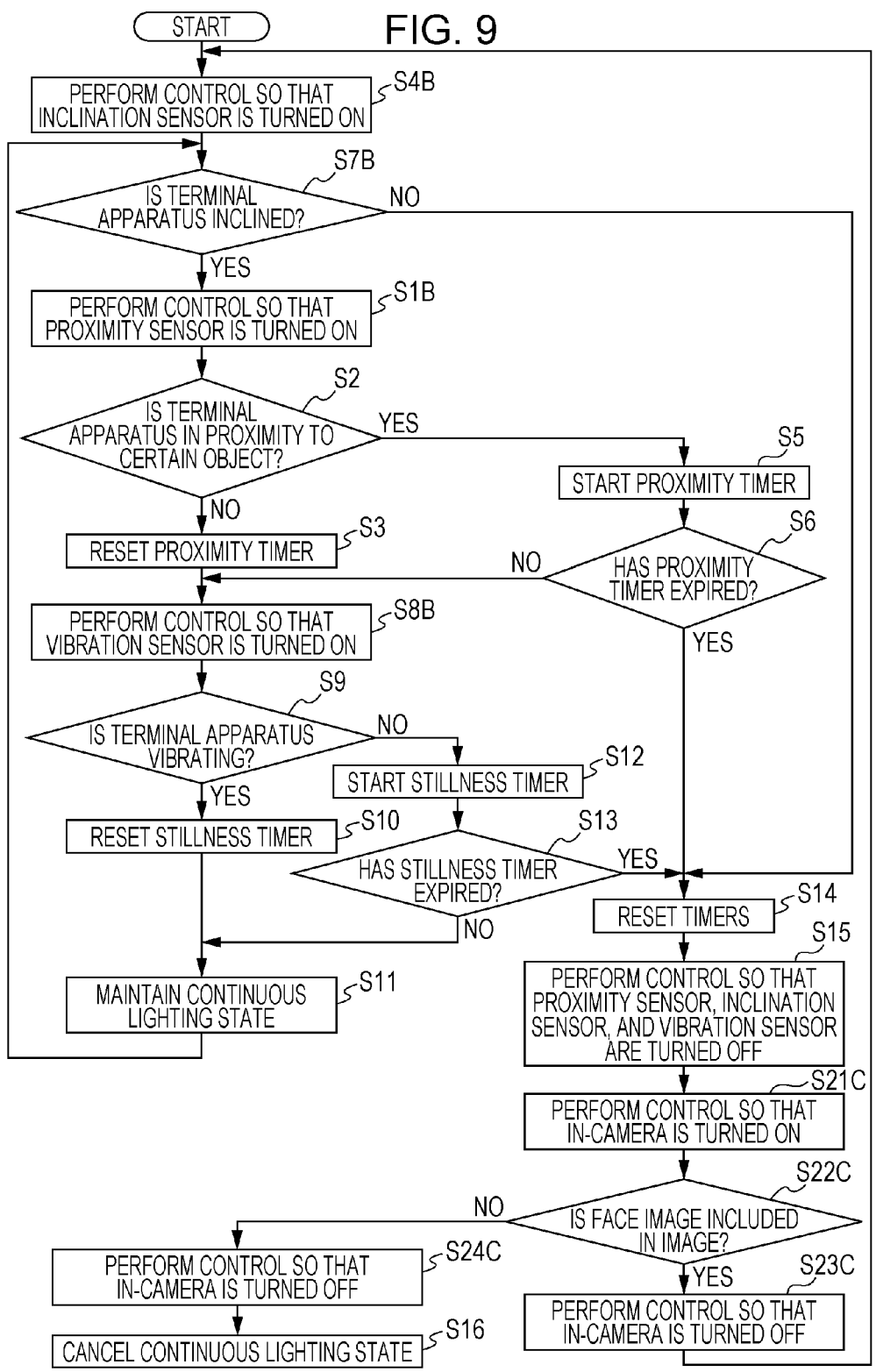
FIG. 9 is a flowchart illustrating a process performed by a control section in a third embodiment.

Next, control of the backlight performed by the control section 31C, that is, a process performed in accordance with the backlight control program according to the third embodiment, will be described in detail with reference to the drawings. FIG. 9 is a flowchart illustrating a process performed by the control section 31C. Processes different from those in the second embodiment will be described below.

The holding-in-hand determination unit 47C of the control section 31C determines that the user is not holding the terminal apparatus 1 in his or her hand, and, in step S15, transmits an instruction to turn off all sensors that are operating. After that, the holding-in-hand determination unit 47C performs control so that the in-camera is turned on (step S21C).

The image acquisition unit 51C acquires an image captured by the in-camera, and transfers the image to the face-image determination unit 52C. The face-image determination unit 52C determines whether a face image is included in the image obtained from the image acquisition unit 51C (step S22C). For example, when a face image is included in the image (YES in step S22C), the face-image determination unit 52C notifies the holding-in-hand determination unit 47C that a face image is included in the image. The holding-in-hand determination unit 47C, which has been notified that a face image is included in the image, determines that the user is using the terminal apparatus 1 while not holding the terminal apparatus 1 in his or her hand. Then, the holding-in-hand determination unit 47C performs control so that the in-camera is turned off (step S23C). After that, the holding-in-hand determination unit 47C transmits, again, to the microcomputer 12, an instruction to turn on the acceleration sensor 13 that serves as an inclination sensor (step S4B).

Moreover, in the process of step S22C, it is determined that no face image is included in the image (NO in S22C), the face-image determination unit 52C notifies the holding-in-hand determination unit 47C that no face image is included in the image. The holding-in-hand determination unit 47C, which has been notified that no face image is included in the image, determines that the user is not using the terminal apparatus 1. Then, the holding-in-hand determination unit 47C performs control so that the in-camera is turned off (step S24C). After that, the holding-in-hand determination unit 47C instructs the display control unit 48 to cancel the continuous lighting state (step S16).

As described above, in the terminal apparatus 1 according to the present embodiment, the holding-in-hand determination unit 47C determines, based on at least any one of results of determination performed by the inclination determination unit 42B, the stillness determination unit 44, and the proximity determination unit 46, whether the user is holding the terminal apparatus 1 in his or her hand. Then, the holding-in-hand determination unit 47 determines, based on a result of determination of whether the user is holding the terminal apparatus 1 in his or her hand, whether the continuous lighting state is to be maintained or cancelled. Accordingly, even though accidental turning off of the backlight is avoided, the backlight may be appropriately turned off when the backlight is unnecessary. Thus, the power consumption may be efficiently reduced. Moreover, when the terminal apparatus 1 is not inclined, cancellation of the continuous lighting state is made possible without driving the proximity sensor 14. Thus, the power consumption may be more efficiently reduced.

Furthermore, in the present embodiment, whether the user is using the terminal apparatus 1 while not holding the terminal apparatus 1 in his or her hand is detected, based on an image captured by the in-camera. Accordingly, automatic turning off of the backlight may be avoided when the user is looking at the display while not holding the terminal apparatus 1 in his or her hand.

Note that, in the present embodiment, the control section 31C is configured by adding the image acquisition unit 51C and the face-image determination unit 52C to the control section 31B in the second embodiment. The control section 31C is not limited thereto. The control section 31C may be configured by adding the image acquisition unit 51C and the face-image determination unit 52C to the control section 31A in the first embodiment.

Fourth Embodiment

In a fourth embodiment, cancellation of the continuous lighting state is made possible without driving the acceleration sensor 13, thereby realizing a further reduction in the power consumption. Note that, because a hardware configuration of a terminal apparatus 1 according to the fourth embodiment is the same as that illustrated in FIG. 1 in the foregoing first embodiment, a description thereof is omitted. Furthermore, the processor 11 illustrated in FIG. 1 executes a backlight control program according to the fourth embodiment, thereby operating as the control section 31A.

Figure 10:
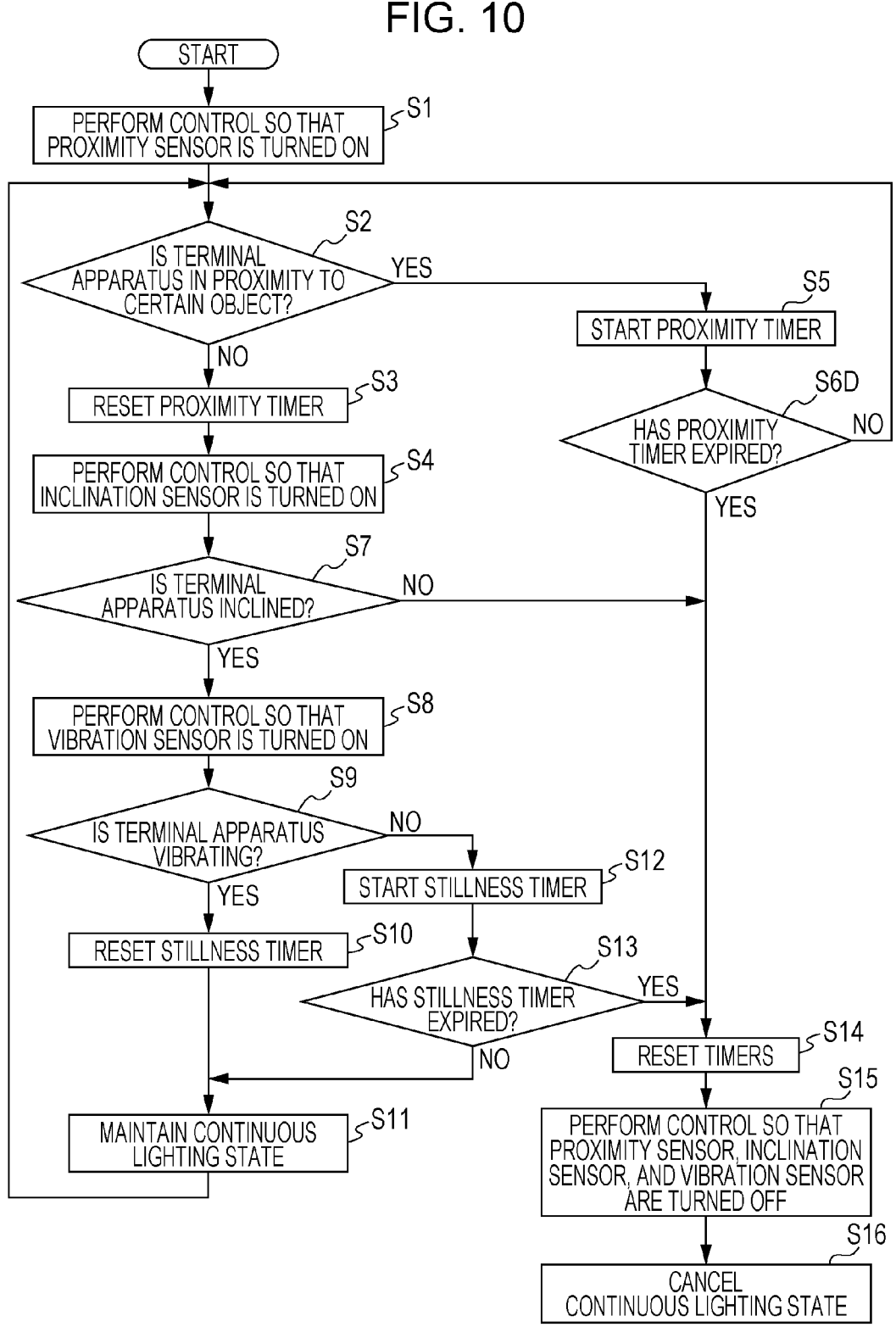
FIG. 10 is a flowchart illustrating a process performed by the control section in a fourth embodiment.

Next, a process performed in accordance with the backlight control program according to the fourth embodiment will be described in detail with reference to the drawings. FIG. 10 is a flowchart illustrating a process performed by the control section 31A. Processes different from those in the first embodiment will be described below.

In the determination process of step S2, when the proximity determination unit 46 determines that the terminal apparatus 1 is in proximity to a certain object (YES in S2), the proximity determination unit 46 starts the proximity timer included in the timer section 18 (step S5). Note that, when the proximity timer has already started counting, the process of step S5 is skipped. Then, the holding-in-hand determination unit 47 determines whether the proximity timer has expired (step S6D). For example, when the holding-in-hand determination unit 47 determines that the proximity timer has not expired (NO in step S6D), the proximity determination unit 46 proceeds to the process of step S2 again. Note that, operations other than this operation are the same as those in the foregoing first embodiment.

FIG. 11 is a table illustrating conditions under which determination of whether the user is holding the terminal apparatus 1 in his or her hand is performed, and time periods taken to determine that the user is not holding the terminal apparatus 1 in his or her hand.

In other words, it is determined that the proximity timer has expired (YES in step S2 and YES in step S6D), the holding-in-hand determination unit 47 determines that the user is not holding the terminal apparatus 1 in his or her hand. This case corresponds to the first case from the top in FIG. 11. In other words, at a point in time when 10 seconds, which is the time period indicating the expiry of the proximity timer, have elapsed since the proximity timer started, the holding-in-hand determination unit 47 may determine that the user is not holding the terminal apparatus 1 in his or her hand.

Furthermore, when the terminal apparatus 1 is not in proximity to any object and is not inclined (NO in step S2 and NO in step S7), the holding-in-hand determination unit 47 determines that the user is not holding the terminal apparatus 1 in his or her hand. This case corresponds to the second case from the top in FIG. 11. In other words, the holding-in-hand determination unit 47 may determine that the user is not holding the terminal apparatus 1 in his or her hand immediately after the proximity sensor 14 has been turned on.

Moreover, when it is determined that the terminal apparatus 1 is not in proximity to any object and is inclined and the stillness timer has expired (NO in step S2, YES in step S7, NO in step S9, and YES in step S13), the holding-in-hand determination unit 47 determines that the user is not holding the terminal apparatus 1 in his or her hand. This case corresponds to the third case from the top in FIG. 11. In other words, at a point in time 60 seconds, which is the time period indicating the expiry of the stillness timer, have elapsed since the stillness timer started, the holding-in-hand determination unit 47 may determine that the user is not holding the terminal apparatus 1 in his or her hand.

Additionally, when it is determined that the terminal apparatus 1 is not in proximity to any object, is inclined, and is vibrating (NO in step S2, YES in step S7, and YES in step S9), the holding-in-hand determination unit 47 determines that the user is holding the terminal apparatus 1 in his or her hand. This case corresponds to the first case from the bottom in FIG. 11.

As described above, in the terminal apparatus 1 according to the present embodiment, the holding-in-hand determination unit 47 determines, based on at least any one of results of determination performed by the inclination determination unit 42, the stillness determination unit 44, and the proximity determination unit 46, whether the user is holding the terminal apparatus 1 in his or her hand. Then, the holding-in-hand determination unit 47 determines, based on a result of determination of whether the user is holding the terminal apparatus 1 in his or her hand, whether the continuous lighting state is to be maintained or cancelled. Accordingly, even though accidental turning off of the backlight is being avoided, the backlight may be appropriately turned off when the backlight is unnecessary. Thus, the power consumption may be efficiently reduced. Furthermore, cancellation of the continuous lighting state is made possible without driving the acceleration sensor 13, thereby realizing a further reduction in the power consumption.

Note that, in the present embodiment, the inclination determination unit 42 determines whether the terminal apparatus 1 is inclined (step S7). However, control of the backlight may be performed without performing this process. In the case where determination of whether the terminal apparatus 1 is inclined is not performed, control of the backlight is performed based on results of determination performed by the stillness determination unit 44 and the proximity determination unit 46. In this case, FIG. 10 becomes a diagram in which steps S4 and S7 are removed, and in which steps S3 and S8 are directly connected.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A terminal apparatus comprising:
   a display device;
   a first sensor configured to detect a proximity state of being in proximity to an object different from the terminal apparatus;
   a second sensor configured to detect vibrations; and
   a processor,
   wherein the processor
   determines whether or not a first detection value acquired from the first sensor indicates that the terminal apparatus is in the proximity state,
   turns off a backlight of the display device when it is determined that the first detection value indicates that the terminal apparatus is in the proximity state, and
   activates the second sensor and acquires, when it is determined that the first detection value does not indicate that the terminal apparatus is in the proximity state, a second detection value from the second sensor, determines whether or not the second detection value, which has been acquired, indicates that the terminal apparatus is vibrating, and turns off, when it is determined that the second detection value does not indicate that the terminal apparatus is vibrating, the backlight of the display device.

2. The terminal apparatus according to claim 1,
   wherein the second sensor is further configured to be capable of detecting an inclination, and
   wherein the processor further determines whether or not the second detection value indicates that the terminal apparatus is inclined, and turns off, when it is determined that the second detection value does not indicate that the terminal apparatus is inclined, the backlight of the display device.

3. The terminal apparatus according to claim 1, wherein the processor further
   determines, when it is determined that the first detection value indicates that the terminal apparatus is in the proximity state or when it is determined that the second detection value does not indicate that the terminal apparatus is vibrating, whether a face image is included in an image captured by an in-camera, and
   turns off, when no face image is included in the image, the backlight of the display device.

4. A backlight control method for a terminal apparatus that includes a display device, a first sensor configured to detect a state of being in proximity to an object different from the terminal apparatus, a second sensor configured to detect vibrations, and a processor, the method comprising:
   with the processor,
   determining whether or not a first detection value acquired from the first sensor indicates that the terminal apparatus is in the proximity state;
   turning off a backlight of the display device when it is determined that the first detection value indicates that the terminal apparatus is in the proximity state; and
   activating the second sensor and acquiring, when it is determined that the first detection value does not indicate that the terminal apparatus is in the proximity state, a second detection value from the second sensor, determining whether or not the second detection value, which has been acquired, indicates that the terminal apparatus is vibrating, and turning off, when it is determined that the second detection value does not indicate that the terminal apparatus is vibrating, the backlight of the display device.

5. A backlight control program executed by a processor executing a series of instructions stored in a non-transitory storage medium, the control program causing, in a terminal apparatus that includes a display device, a first sensor configured to detect a state of being in proximity to an object different from the terminal apparatus, a second sensor configured to detect vibrations, and the processor, the processor to execute a process, the process comprising:
   determining whether or not a first detection value acquired from the first sensor indicates that the terminal apparatus is in the proximity state;
   turning off a backlight of the display device when it is determined that the first detection value indicates that the terminal apparatus is in the proximity state; and
   activating the second sensor and acquiring, when it is determined that the first detection value does not indicate that the terminal apparatus is in the proximity state, a second detection value from the second sensor, determining whether or not the second detection value, which has been acquired, indicates that the terminal apparatus is vibrating, and turning off, when it is determined that the second detection value does not indicate that the terminal apparatus is vibrating, the backlight of the display device.

* * * * *